(12) United States Patent
Raman et al.

(10) Patent No.: US 8,111,828 B2
(45) Date of Patent: Feb. 7, 2012

(54) MANAGEMENT OF CRYPTOGRAPHIC KEYS FOR SECURING STORED DATA

(75) Inventors: Shankar Raman, Karnataka (IN);
Kiran Kumar Malle Gowda, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1225 days.

(21) Appl. No.: 11/888,044

(22) Filed: Jul. 31, 2007

(65) Prior Publication Data
US 2009/0034733 A1 Feb. 5, 2009

(51) Int. Cl.
*H04L 29/06* (2006.01)
(52) U.S. Cl. .......................... 380/277; 380/43
(58) Field of Classification Search ............... 380/42, 380/43, 277, 278
See application file for complete search history.

(56) References Cited

U.S. PATENT DOCUMENTS

| 5,442,703 | A | * | 8/1995 | Kim et al. | 380/271 |
|---|---|---|---|---|---|
| 6,061,799 | A | * | 5/2000 | Eldridge et al. | 726/20 |
| 6,711,677 | B1 | * | 3/2004 | Wiegley | 713/151 |
| 7,281,130 | B2 | * | 10/2007 | Johnson et al. | 713/162 |
| 2003/0016821 | A1 | * | 1/2003 | Hammersmith | 380/37 |
| 2003/0046534 | A1 | * | 3/2003 | Alldredge | 713/153 |
| 2006/0285693 | A1 | * | 12/2006 | Raikar | 380/278 |
| 2008/0276086 | A9 | * | 11/2008 | Proudler | 713/165 |

* cited by examiner

*Primary Examiner* — Hadi Armouche

(57) ABSTRACT

A management system generates a sequence of keys and an identifier of each key in the sequence. A current key in the sequence and the identifier of the current key are transferred from the management system to a storage system. The storage system encrypts the data into encrypted data using the current key. The storage system stores the identifier and the encrypted data. The identifier and the encrypted data are retrieved from the storage system. The key in the sequence identified by the identifier is transferred from the management system to the storage system. The storage system decrypts the encrypted data using the decryption key.

12 Claims, 6 Drawing Sheets

MANAGEMENT OF CRYPTOGRAPHIC KEYS FOR SECURING STORED DATA

FIELD OF THE INVENTION

The present disclosure generally relates to securing stored data using data encryption.

BACKGROUND

Network storage may be used to store data remotely for later retrieval. The data in network storage should be readily accessible to authorized users. However, data stored remotely is vulnerable to unauthorized use. The data is vulnerable during transit to and from the network storage. Less appreciated is that the data is also vulnerable while stored in network storage. Employees or former employees responsible for the network storage may steal the information. Typically, unauthorized access comes from internal sources.

Security controls may limit access to authorized users. To secure data in dynamic environments with employee turnover, the security controls may require frequent updates. However, the security controls should not impede access to the data by authorized users. When a security control is updated, an authorized user that is unaware of the updated security control may be prevented from accessing the secured data. An authorized user should be able to access secured data even though the security control is recently updated.

The security controls for network storage should be compatible with a wide variety of storage systems. The security controls should use existing proven techniques for authenticating authorized users.

There is a need for flexible security controls for storing data in network storage.

DETAILED DESCRIPTION

Figure 1:
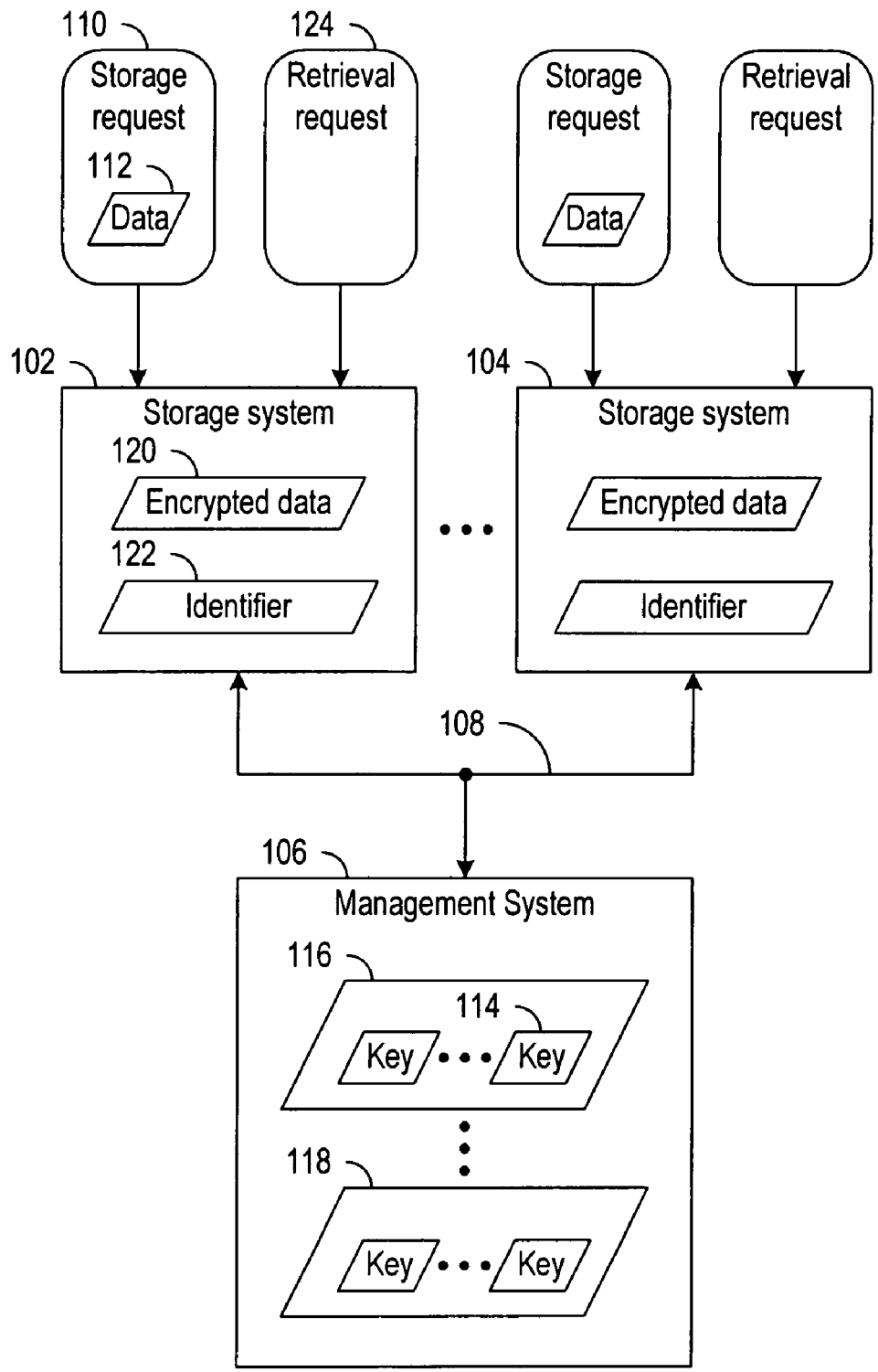
FIG. 1 is a block diagram of a system for securing stored data in accordance with various embodiments of the invention.

FIG. 1 is a block diagram of a system for securing stored data in accordance with various embodiments of the invention. Storage systems 102 and 104 may encrypt and store data for later retrieval and decryption. Management system 106 may track the keys for encrypting and decrypting the data. A computer network on line 108 may interconnect management system 106 and storage systems 102 and 104.

The management system 106 may be a central repository of the encryption and decryption keys for the storage systems 102 through 104. The management system may update the keys according to a policy, such as weekly update of the keys. The central repository may enhance the security of the keys and permit enforced updating of the keys without data becoming inaccessible because a key has been recently updated.

Storage system 102 may receive a request 110 to store data 112. To encrypt and store the data 112, the storage system 102 may request from the management system 106 an encryption key of the current key 114 for the storage system 102. The current key 114 may be a symmetric key for both encryption and decryption, or the current key 114 may be a combination of a current encryption key and a current decryption key.

The management system 106 may maintain respective sequences 116 through 118 of keys for the storage systems 102 through 104. The sequence 116 of keys may be associated with the storage system 102, and the sequence 118 of keys may be associated with the storage system 104. Each storage system 102 or 104 has an address, such as an identifier from an authentication protocol and/or an internet protocol address, associating the storage system with the corresponding one of sequences 116 through 118. In one embodiment, a storage system 102 may have one or more users each having a user identifier. Sequence 116 may be associated with one user of storage system 102 and sequence 118 may be associated with another user of storage system 102. An address including the user identifier may associate each user of each storage system 102 or 104 with a corresponding one of sequence 116 through 118.

Upon receiving a storage request 110, storage system 102 may request the encryption key of the current key 114 in the sequence 116 associated with the storage system 102. The management system 106 may return the encryption key along with an identifier 122 of the current key 114 in the sequence 116. The storage system 102 may encrypt the data 112 into encrypted data 120 using the encryption key and store this encrypted data 120 together with the identifier 122.

Later, the storage system 102 may receive request 124 to retrieve the data 112 from the storage request 110. The storage system 102 may retrieve the encrypted data 120 and the identifier 122. The storage system 102 may request from the management system 106 a decryption key of a key 114 identified by the identifier 122 in the sequence 116 associated with the storage system 102. The management system 106 may return the decryption key to the storage system 102. The storage system 102 may decrypt the encrypted data 120 using the decryption key to recreate the data 112. The storage system 102 may return the recreated data in a retrieval response (not shown) for the retrieval request 124.

Depending on the interval between the storage request 110 and the retrieval request 124, the key 114 used for encrypting the data 112 may no longer be the current key in the sequence 116 associated with the storage system 102. For example, every week the management system 106 may generate a new current key for each of the sequences 116 through 118. If the retrieval request 124 comes several weeks after the storage request 110, then the key 114 used for encrypting data 112 is no longer the current key in the sequence 116. But the identifier 122 still permits the identification of the proper key 114 in the sequence 116.

The management system 106 may periodically generate a new current key for each of the sequences 116 through 118. It will be appreciated that other approaches may be used to generate a new key for each sequence 116 through 118. For example, the management system 106 may track the number of requests for encryption using a current key 114 or the number of requests for both encryption and decryption using a current key 114. When this number of requests exceeds a threshold or an allowed lifetime is exceeded, the management system may generate a new current key. This approach may be combined with the management system 106 tracking the number of data objects encrypted with each key in each of the sequences 116 through 118. Each storage system 102 or 104 may notify the management system 106 upon deleting an encrypted data object. When the tracked number of encrypted data objects becomes zero for a key in sequences 116 or 118, the management system 106 may delete the key from its sequence.

Management system 106 is implemented on a computing arrangement having suitable processing and retentive storage capabilities for managing the sequences of keys. In one embodiment the management system is implemented on a computer workstation and in an alternative embodiment the management system is implemented on a network of workstations. Alternatively, the management system is implemented on a large-scale, multi-processor, shared-memory computer system. Other embodiments include parallel processing computer systems.

Storage systems 102 and 104 are implemented on storage systems having sufficient retentive storage capacity for the encrypted data and keys and sufficient processing capacity for processing access requests. In one embodiment, each storage system may be a networked computer system internal storage. In another embodiment, each storage system may be network attached storage coupled to a networked computer. In another embodiment, each storage system may be storage area network supplemented with computer processing capabilities for encryption etc. Those skilled in the art will recognize that various combinations of the different types of storage systems may be used according to application requirements.

Figure 2:
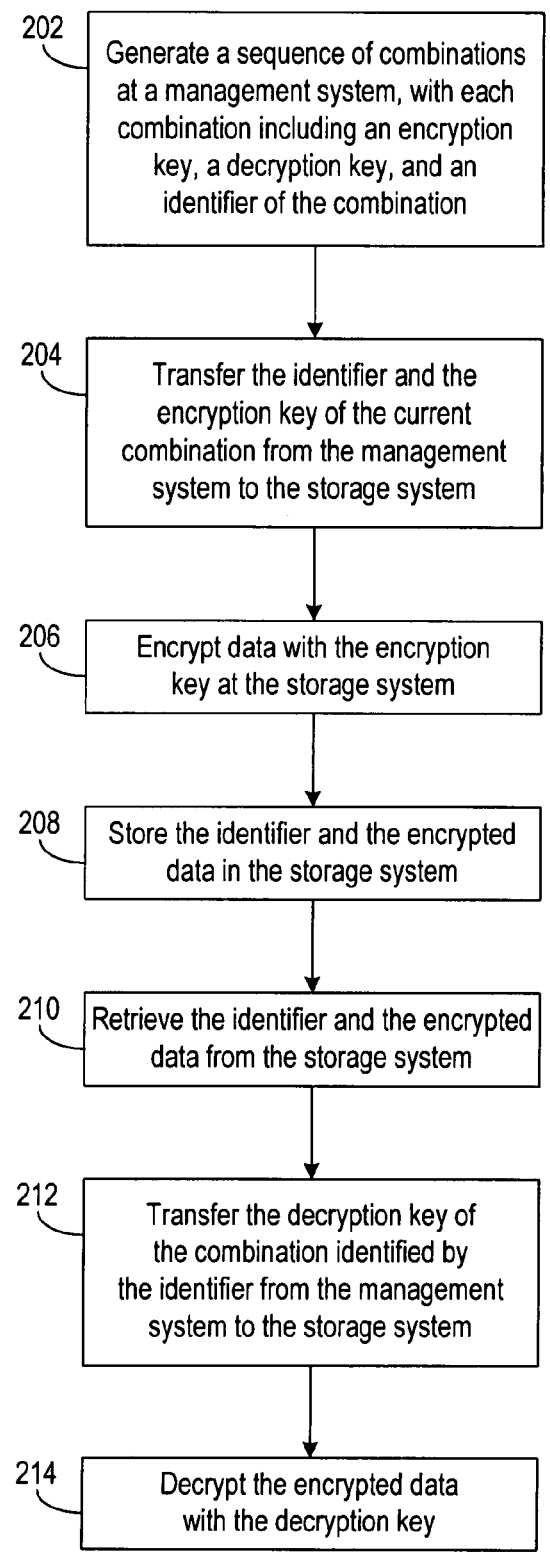
FIG. 2 is a flow diagram of a process for securing stored data in accordance with various embodiments of the invention.

FIG. 2 is a flow diagram of a process for securing stored data in accordance with various embodiments of the invention. A storage system and a management system cooperate to perform steps 202 through 214.

At step 202, a management system generates a sequence of key combinations for a storage system. Each key combination has an encryption key, a decryption key, and an identifier of the key combination. It will be appreciated that a key combination may include only one key that is a symmetric key used for both encryption and decryption. In one embodiment, the management system periodically adds a new key combination to the sequence for the storage system along with an incremented sequence number that identifies the new key combination in the sequence. A random number generator or a pseudo-random number generator may be used to randomly generate the encryption and decryption keys of the new key combination.

At step 204, the management system transfers to the storage system the identifier and the encryption key of a current combination in the sequence for the storage system. The management system may transfer the identifier and the encryption key of the current combination in response to a request at the storage system to store data. At step 206, the storage system encrypts data using the encryption key. At step 208, the storage system stores the identifier and the encrypted data.

At step 210, the storage system may retrieve the identifier and the encrypted data. The storage system may retrieve the identifier and the encrypted data in response to a request at the storage system to retrieve data. At step 212, the management system transfers to the storage system the decryption key of the key combination identified by the identifier in the sequence for the storage system. At step 214, the storage system decrypts the encrypted data using the decryption key.

Figure 3:
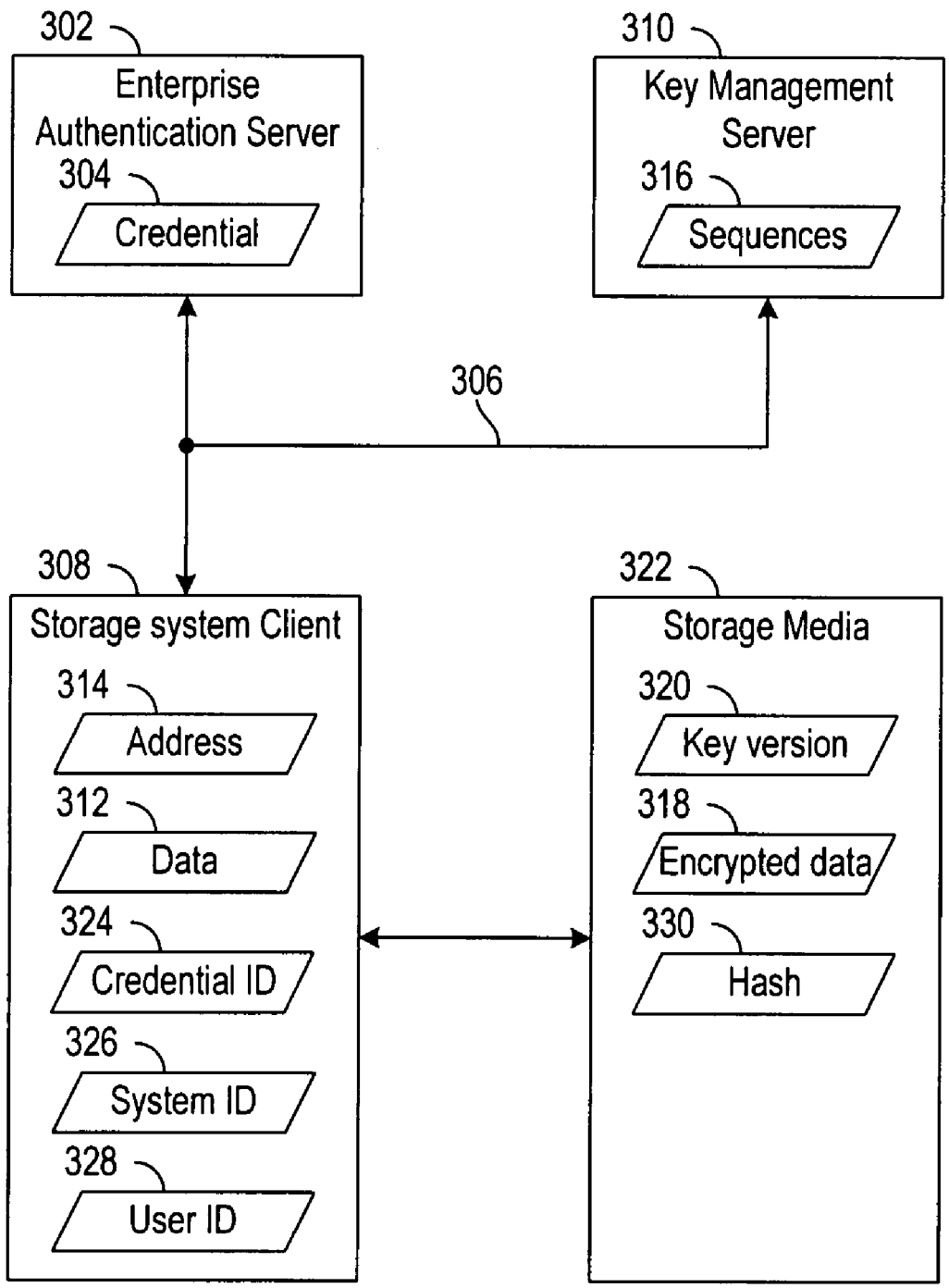
FIG. 3 is a block diagram of a key management system for securing stored data in accordance with various embodiments of the invention.

FIG. 3 is a block diagram of a key management system for securing stored data in accordance with various embodiments of the invention. An enterprise authentication server 302 may provide a credential 304 that may include a secret cryptographic key.

The computer network 306 may interconnect the enterprise authentication server 302 with a storage system client 308 and a key management server 310. The storage system client 308 may obtain the credential 304 during an authentication procedure with the enterprise authentication server 302. The key management server 310 may similarly obtain the credential 304.

The storage system client 308 and the key management server 310 may securely exchange information via computer network 306 using the credential 304. After receiving a storage request to store data 312, the storage system client 308 may request an encryption key from key management server 310. The request for the encryption key may include an address 314 of the storage system client 308. The computer network 306 may securely transfer the request for the encryption key from storage system client 308 to key management server 310 using credential 304.

Address 314 may be an identifier that includes one or more of an identifier 324 of credential 304, an identifier 326 of storage system client 308, and an identifier 328 of a user of the storage system client 308. The identifier 324 of the credential 304 may be obtained during the authentication procedure with the enterprise authentication server 302. The identifier 326 may be an internet protocol address of the storage system client 308 or a name of storage system client 308 from a name server (not shown). The user identifier 328 may be an identifier of one of multiple users of the storage system client 308.

The key management server 310 may find the appropriate one of sequences 316 associated by address 314 with storage system client 308. The key management server 310 may transfer a current encryption key from this sequence to storage system client 308 along with a version number for the current encryption key. The computer network 306 may securely transfer the encryption key and its version number from key management server 310 to storage system client 308 using the credential 304.

The storage system client 308 may encrypt the data 312 using the encryption key. The storage system client 308 may store the encrypted data 318 and the key version number 320 in storage media 322. The storage system client 308 may optionally store a cryptographic hash 330 of the address 314, the key version number 320, and the encrypted data 318 in the storage media 322. The storage system client 308 may then delete any record of the encryption key and the data 312.

Later, the storage system client 308 may receive a request for data. The storage system client 308 may retrieve the key version number 320 from storage media 322. The storage system client 308 may optionally check that the cryptographic hash 330 matches a regenerated cryptographic hash of the address 314, the key version number 320, and the encrypted data 318. For a mismatch of hash 330, the storage system client 308 may log an error instead of decrypting encrypted data 318. The storage system client 308 may request a decryption key from key management server 310. The request for the decryption key may include the address 314 and the key version number 320. The computer network 306 may securely transfer the decryption key request from storage system client 308 to key management server 310 using credential 304.

The key management server 310 may find the decryption key having the key version number 320 in the sequence of sequences 316 associated with the address 314 of the storage system client 308. The computer network 306 may use credential 304 to securely transfer this decryption key from key management server 310 to storage system client 308.

Storage system client 308 may retrieve the encrypted data 318 from storage media 322 and decrypt the encrypted data 318 using the decryption key. The storage system client may return the decrypted data to a requester (not shown). If the requester is another device on computer network 306 that has performed an authentication procedure with enterprise authentication server 302, then the computer network 306 may use credential 304 to securely transfer the decrypted data to the requester. The storage system client 308 may then delete any record of the decryption key and the decrypted data.

In one embodiment, the storage system client 308 and the storage media 322 are a storage system that is a desktop computer. The desktop computer may store secured data in the storage media 322 within the desktop computer. The desktop computer may usually support a single user at a user interface of the desktop computer. Address 314 may include identifier 324 of credential 324 and either system identifier 326 or user identifier 328.

Figure 4:
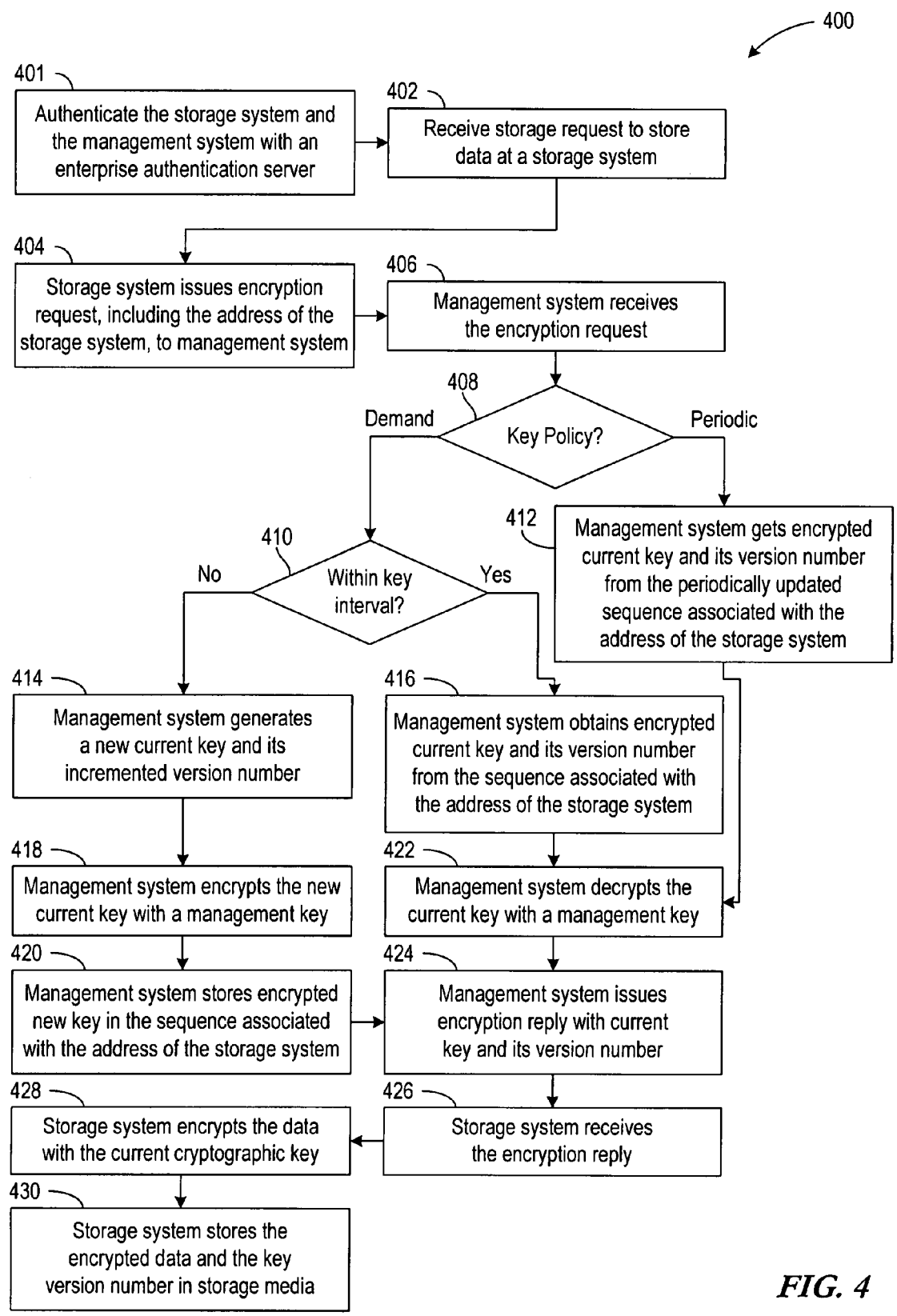
FIG. 4 is a flow diagram of a process for securely storing data in accordance with various embodiments of the invention.

FIG. 4 is a flow diagram of a process 400 for securely storing data in accordance with various embodiments of the invention. Stored data may be subsequently retrieved using the process of FIG. 5 discussed below.

At step 401, the storage system and the management system perform an authentication procedure with an enterprise authentication server. The authentication procedure may provide a credential to the storage system and the management system. Example authentication protocols for the authentication procedure include the Kerberos and Radius authentication protocols.

At step 402, a storage system receives a request to store data. At step 404, the storage system issues an encryption request that includes an address of the storage system. At step 406, a management system receives the encryption request.

The management system may generate keys periodically or in response to encryption requests. In one embodiment, the policy for generating keys may be set independently for each storage system. If the management system generates keys on demand, then process 400 proceeds from decision 408 to decision 410. If the management system periodically generates a new current key for the storage system, process 400 proceeds to step 412.

At decision 410, the management system checks for expiration of the current key by checking the time interval since the current key was generated and/or the number of times the current key has been used. If the current key exceeds a usage limit, process 400 proceeds to step 414. If the current key is within the usage limit or limits, process 400 proceeds to step 416.

At step 414, the management system generates a new key and increments a version number. The new key becomes the current key for the storage system and the incremented version number becomes the identifier for the new current key. At step 418, the management system encrypts the current key using a management key. At step 420, the management system stores the encrypted current key in the sequence associated with the address of the storage system.

At steps 412 and 416, the management system obtains the encrypted current key and its version number from the sequence associated with the address of the storage system. At step 422, the management system decrypts the current key with the management key. At step 424, the management system issues an encryption reply that includes the current key and its version number.

At step 426, the storage system receives the encryption reply. At step 428, the storage system encrypts the data with the current key. At step 430, the storage system stores the encrypted data and the key version number in a storage media. A cryptographic hash of the address of the storage system, the key version number, and the encrypted data may optionally be stored in the storage media.

Figure 5:
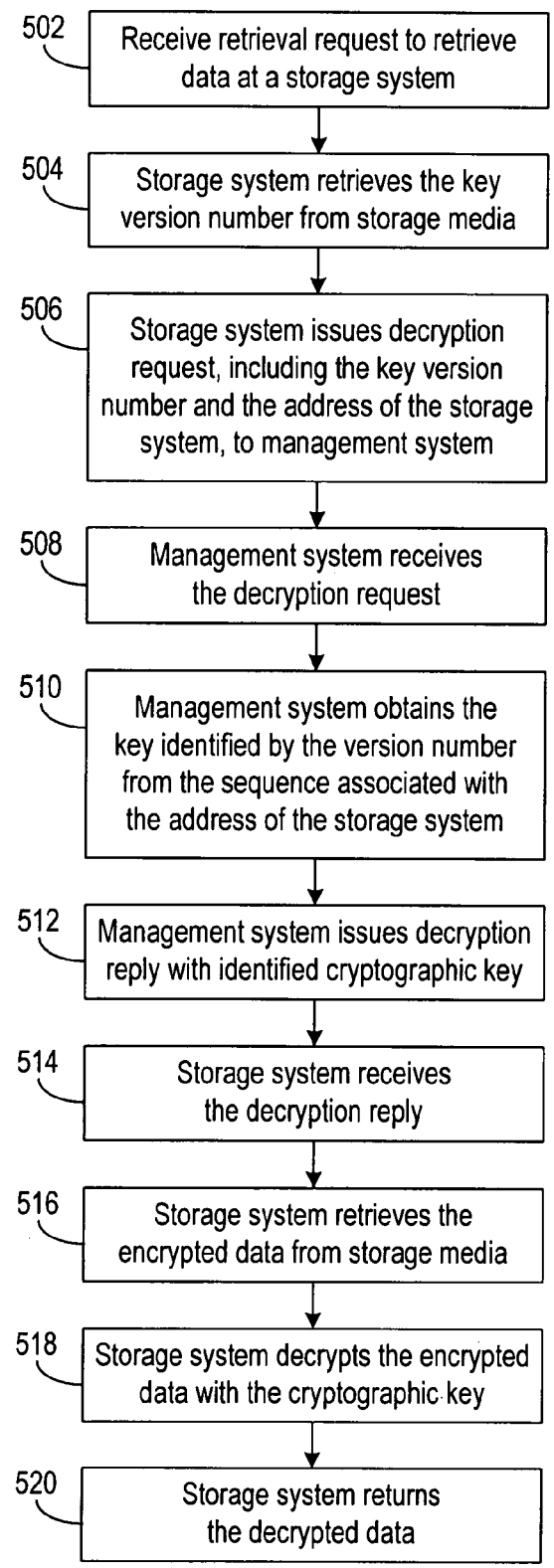
FIG. 5 is a flow diagram of a process for retrieving securely stored data in accordance with various embodiments of the invention.

FIG. 5 is a flow diagram of a process for retrieving securely stored data in accordance with various embodiments of the invention. The retrieved data may have been previously stored using the process of FIG. 4 discussed above.

At step 502, a storage system receives a request to retrieve data. At step 504, the storage system retrieves the key version number for the data from a storage media. Optionally, the cryptographic hash and the encrypted data may also be retrieved. The cryptographic hash may be checked to ensure that the address, the key version number, and the encrypted data are not corrupted. At step 506, the storage system issues a decryption request to a management system. The decryption request includes an address of the storage system and the key version number retrieved from the storage media.

At step 508, the management system receives the decryption request. At step 510, the management system obtains the key identified by the version number from a sequence associated with the address of the storage system. At step 512, the management system issues a decryption reply with the identified decryption key.

At step 514, the storage system receives the decryption reply. At step 516, the storage system retrieves the encrypted data from the storage media. At step 518, the storage system decrypts the encrypted data with the decryption key. At step 520, the storage system returns the decrypted data.

Figure 6:
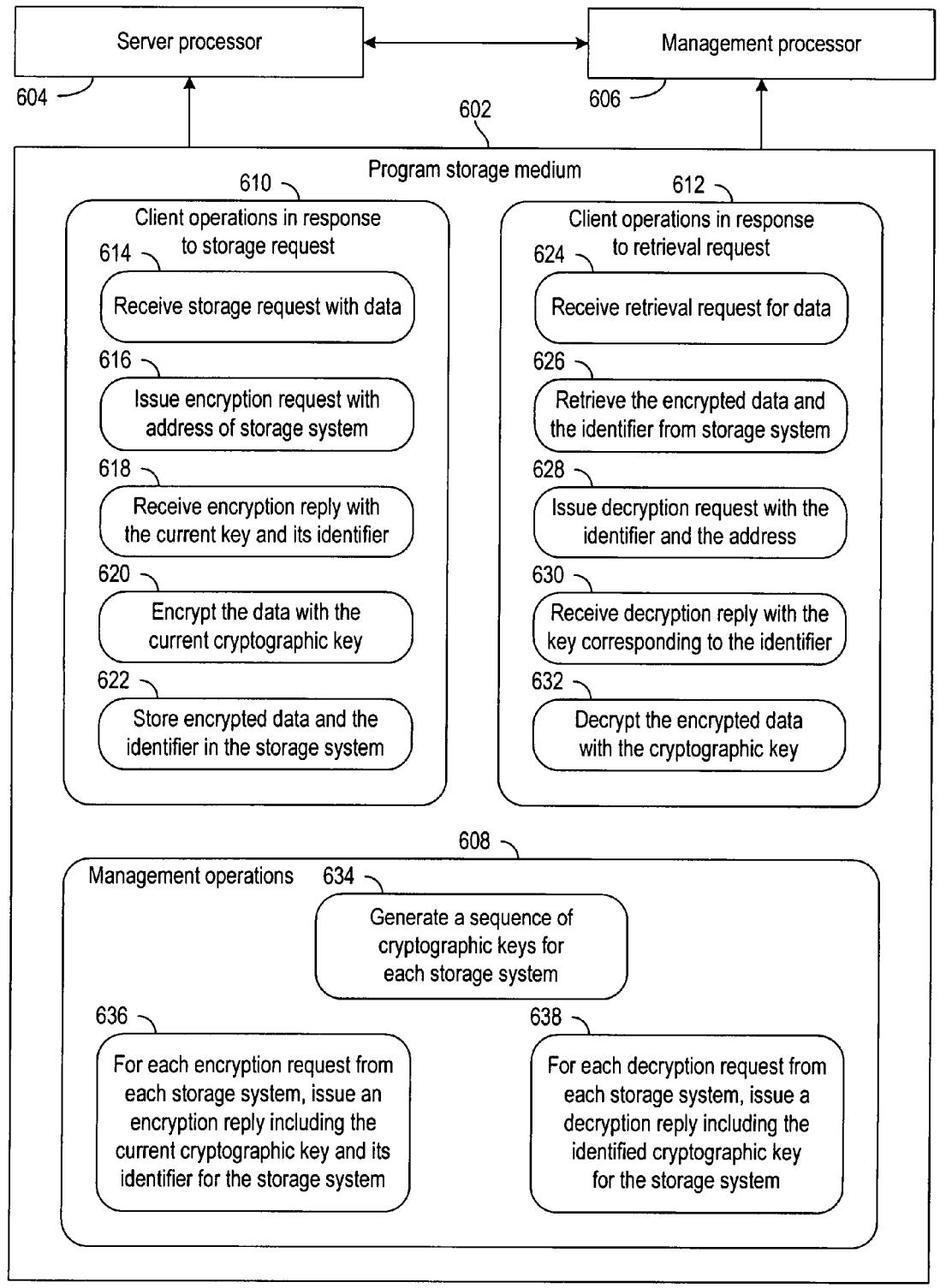
FIG. 6 is a block diagram illustrating a program storage medium for securing stored data in accordance with one or more embodiments of the invention.

FIG. 6 is a block diagram illustrating a program storage medium 602 for securing stored data in accordance with one or more embodiments of the invention. The program storage medium 602 may be configured with instructions for securing stored data. The instructions in program storage medium 602 may include management module 608 executed by management processor 606 and client modules 610 and 612 executed by server processor 604.

Execution of the instructions of client module 610 by server processor 604 may cause server processor 604 to perform operations in response to a storage request. The instructions 614 may be for receiving a storage request with data. The instructions 616 may be for issuing an encryption request with the address of the storage system. The instructions 618 may be for receiving a reply to the encryption request with the reply including the current cryptographic key and an identifier of the current cryptographic key. The instructions 620 may encrypt the data with the current cryptographic key. The instructions 622 may store the encrypted data and the identifier in the storage system.

Execution of the instructions of client module 612 by server processor 604 may cause server processor 604 to perform operations in response to a retrieval request. The instructions 624 may be for receiving a data retrieval request. The instructions 626 may retrieve the encrypted data and the identifier from the storage system. The instructions 628 may issue a decryption request including the identifier and the address of the storage system. The instructions 630 may receive a reply to the decryption request with the reply including the cryptographic key for the storage system that corresponds to the identifier. The instructions 632 decrypt the encrypted data with the cryptographic key.

Execution of the instructions of management module 608 by management processor 606 may cause management processor 606 to perform key management operations. The instructions 634 may be for generating a sequence of cryptographic keys for each storage system. In one embodiment, instructions 634 may cause management processor 606 to periodically generate a new current cryptographic key for each storage system. The instructions 636 may be for issuing an encryption reply for each encryption request received from a storage system. The encryption reply may include the current cryptographic key for the storage system and an identifier of the current cryptographic key. The instructions 638 may be for issuing a decryption reply for each decryption request received from a storage system. The decryption reply may include the cryptographic key for the storage system that the identifier identifies.

In one embodiment, server processor 604 is a desktop computer that may receive storage and retrieval requests from a user at a user interface of the desktop computer. The desktop computer may store data in storage media within the desktop computer by executing the client operations 610, and the desktop computer may retrieve data from the storage media by executing the client operations 612.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of storage systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A system for securing stored data, comprising:
a storage system to:
receive storage and retrieval requests;
in response to the storage request received at the storage system, issue, to a management system, an encryption request including an address of the storage system;
in response to the encryption request, receive, from the management system, an encryption reply including a current cryptographic key and an identifier of the current cryptographic key within a sequence of cryptographic keys for the storage system;
encrypt data of the storage request into encrypted data using the current cryptographic key;
store the encrypted data and the identifier in a storage media;
in response to the retrieval request received at the storage system, retrieve encrypted data and a particular identifier from the storage media;
in response to the retrieval request received at the storage system, issue, to the management system, a decryption request including the particular identifier retrieved from the storage media and the address of the storage system;
receive, from the management system in response to the decryption request, a decryption reply including a cryptographic key corresponding to the particular identifier within the sequence for the storage system; and
decrypt the retrieved encrypted data using the cryptographic key in the decryption reply.

2. The system of claim 1, further comprising an authentication server, wherein the storage system and the management system are to obtain a credential from the authentication server during an authentication procedure, where the credential protects a first transfer from the management system to the storage system of the current cryptographic key and the identifier of the current cryptographic key, a second transfer from the storage system to the management system of the particular identifier, and a third transfer from the management system to the storage system of the cryptographic key corresponding to the particular identifier.

3. The system of claim 1, further comprising at least another storage system, wherein the management system is coupled to the storage systems via a computer network.

4. The system of claim 3, wherein at least one of the storage systems is a desktop computer for a user, and an address of the desktop computer system includes an identifier that is at least one of an identifier of the desktop computer system and an identifier of the user.

5. A method for securing first data, comprising:
receiving a storage request at a storage system to store the first data;
in response to the storage request, issuing, by the storage system to a management system, an encryption request that includes a unique address of the storage system;
receiving, at the storage system from the management system, a particular identifier and a particular encryption key in response to the encryption request, where the particular identifier and the particular encryption key are from a respective one of a sequence of combinations provided by the management system, and where each of the combinations includes a corresponding encryption key, a decryption key, and identifier of the corresponding combination;
encrypting the first data into second data at the storage system using the particular encryption key;
storing the particular identifier and the second data in the storage system;
receiving a retrieval request at the storage system to retrieve the first data;
in response to the retrieval request, retrieving the particular identifier and the second data, and issuing, by the storage system to the management system, a decryption request that includes the particular identifier and the unique address of the storage system;
receiving, by the storage system from the management system in response to the decryption request, a decryption key of the combination identified in the sequence by the particular identifier; and
decrypting the second data into third data at the storage system using the received decryption key, wherein the third data matches the first data.

6. The method of claim 5, wherein the storing of the particular identifier and the second data in the storage system includes storing in the storage system a cryptographic hash of the particular identifier, the second data, and the unique address of the storage system; and the retrieving of the particular identifier and the second data from the storage system includes retrieving and checking the cryptographic hash.

7. The method of claim 5, wherein the storage system is one of a plurality of storage systems, each of the storage systems having a respective unique address, and the sequence of combinations is one of a plurality of sequences of combinations, each of the sequences associated with the unique address of a corresponding one of the storage systems.

8. The method of claim 5, further comprising storing the sequence of combinations in the management system, wherein the storing of each combination in the sequence includes encrypting the encryption and decryption keys of the combination using a management key of the management system, and wherein the encrypted encryption and decryption keys are decrypted using the management key of the management system prior to transfer to the storage system.

9. The method of claim 5, further comprising authenticating the storage system with an enterprise authentication server, and authenticating the storage system to the management system using a credential from the authenticating of the storage system with the enterprise authentication server.

10. The method of claim 9, wherein the credential secures transfer of the particular identifier and the particular encryption key from the management system to the storage system and transfer of the decryption key from the management system to the storage system.

11. The method of claim 5, wherein the unique address includes an identifier that is at least one of an identifier of the credential, an identifier of the storage system, and an identifier of a user of the storage system.

12. An article of manufacture, comprising:
   a non-transitory computer-readable storage medium configured with instructions for securing first data, wherein execution of the instructions by a storage system causes the storage system to:
      receive a storage request to store the first data;
      in response to the storage request, issue, to a management system, an encryption request that includes a unique address of the storage system;
      receive, from the management system, a particular identifier and a particular encryption key in response to the encryption request, where the particular identifier and the particular encryption key are from a respective one of a sequence of combinations provided by the management system, and where each of the combinations includes a corresponding encryption key, a decryption key, and identifier of the corresponding combination;
      encrypt the first data into second data at the storage system using the particular encryption key;
      store the particular identifier and the second data in the storage system;
      receive a retrieval request at the storage system to retrieve the first data;
      in response to the retrieval request, retrieve the particular identifier and the second data, and issue, to the management system, a decryption request that includes the particular identifier and the unique address of the storage system;
      receive, from the management system in response to the decryption request, a decryption key of the combination identified in the sequence by the particular identifier; and
      decrypt the second data into third data at the storage system using the received decryption key, wherein the third data matches the first data.

* * * * *